United States Patent [19]

Kitamura

[11] Patent Number: 4,469,127

[45] Date of Patent: Sep. 4, 1984

[54] SIGNAL GENERATING DEVICE IN RESPONSE TO THE DEGREE OF OPENING OF A THROTTLE VALVE

[75] Inventor: Kazuhiko Kitamura, Nagoya, Japan

[73] Assignee: Aisin Seiki Kabushiki Kaisha, Kariya, Japan

[21] Appl. No.: 362,401

[22] Filed: Mar. 26, 1982

[30] Foreign Application Priority Data

Mar. 27, 1981 [JP] Japan .................................. 56-45973

[51] Int. Cl.[3] .......................... F16K 37/00; F15B 5/00

[52] U.S. Cl. ...................................... 137/554; 137/85; 137/596; 137/627.5

[58] Field of Search ............... 137/85, 554, 596, 627.5

[56] References Cited

U.S. PATENT DOCUMENTS

| | | | |
|---|---|---|---|
| 2,678,661 | 5/1954 | Roper et al. | 137/554 |
| 3,739,797 | 6/1973 | Caldwell | 137/627.5 X |
| 3,938,329 | 2/1976 | van Basshuysen | 137/554 X |
| 3,978,175 | 8/1976 | Stoltman | 137/627.5 X |
| 4,134,418 | 1/1979 | Woodcock | 137/627.5 X |
| 4,315,521 | 2/1982 | Anderson et al. | 137/85 |
| 4,316,479 | 2/1982 | Franz et al. | 137/85 |
| 4,347,699 | 9/1982 | Kitamura | 137/85 |
| 4,366,670 | 1/1983 | Kitamura | 137/85 X |

*Primary Examiner*—Alan Cohan
*Assistant Examiner*—John A. Rivell
*Attorney, Agent, or Firm*—Oblon, Fisher, Spivak, McClelland & Maier

[57] ABSTRACT

The signal generating device provides both an electrical signal as well as a vacuum signal in response to the degree of opening of a throttle valve in a single body which has a vacuum inlet port and a vacuum outlet port as well as a atmospheric inlet port and which includes a movable diaphragm positioned within the body to define a vacuum chamber in communication with the vacuum outlet port and an atmospheric chamber in communication with the atmospheric inlet port with the movable diaphragm being responsive to the vacuum pressure within the vacuum chamber. The movable diaphragm is controlled by biasing springs and a valve member is associated with a diaphragm to control fluid communications between the vacuum inlet port and the vacuum chamber as well as fluid communication between the vacuum chamber and the atmospheric chamber. A cam, which is connected to the throttle valve, is rotatably positioned in the body of the device to both control the movable diaphragm and a potentiometer, which is situated on the cam, for outputting an electrical signal proportional to the throttle opening.

8 Claims, 4 Drawing Figures

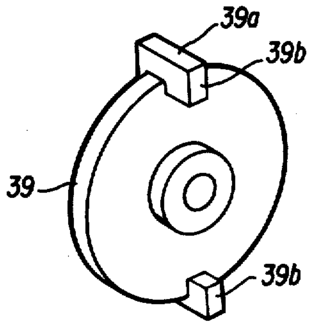
FIG. 2
FIG. 3
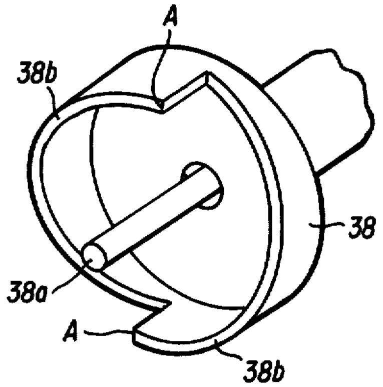
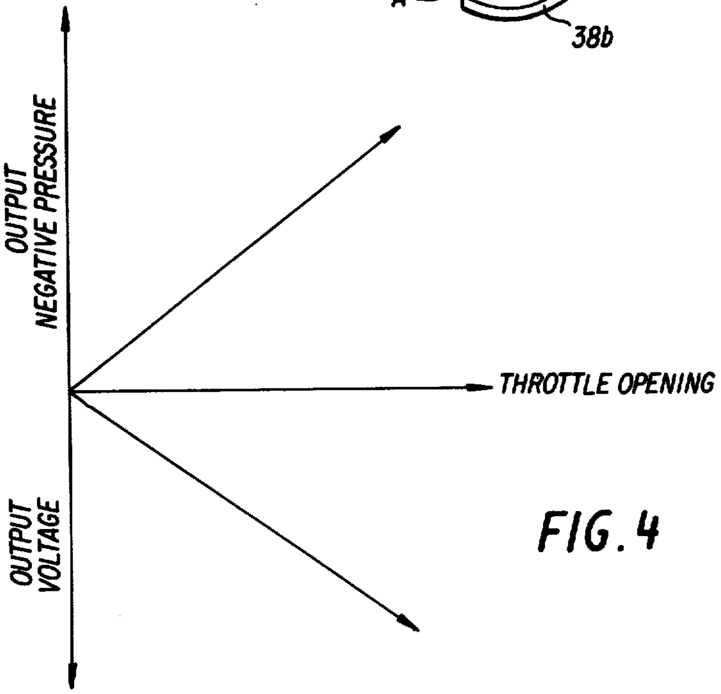
FIG. 4

SIGNAL GENERATING DEVICE IN RESPONSE TO THE DEGREE OF OPENING OF A THROTTLE VALVE

BACKGROUND OF THE INVENTION

1. Field of the Invention

This invention relates to a signal generating device operable and more particularly a signal generating device to generate vacuum and electrical signals in response to the degree of opening of a throttle valve for a vehicle engine.

2. Description of the Prior Art

The emission control system for a vehicle has various devices which are required to be operated in response to the opening degree of a throttle valve, and it is known to use vacuum and electrical signals as input signals to operate these devices. Conventionally, a vacuum signal, in response to the degree of opening of a throttle valve, is obtained by a vacuum signal generating device which is operatively connected to the throttle valve while the electrical signal in response to the degree of opening of the throttle valve is obtained by a potentiometer which is operatively connected to the throttle valve. This requires an independent vacuum signal generating device as well as a potentiometer, which is not cost expedient.

SUMMARY OF THE INVENTION

Accordingly, one object of this invention is to provide a new and improved signal generating device which generates a vacuum and electrical signals in response to the degree of opening of a throttle valve and which obviates the above prior drawback.

It is another object of the present invention to provide a new and improved signal generating device which generates a vacuum and electrical signals in response to the degree of opening of the throttle valve and which is simple in construction and low in cost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an oblique view of the retainer applied in the device of FIG. 1;

FIG. 3 is a view similar to FIG. 2 but showing the cam means; and

FIG. 4 is a graph showing the performance of the signal generator of the present invention.

DETAILED DESCRIPTION OF THE PREFERRED EMBODIMENT

Figure 1:
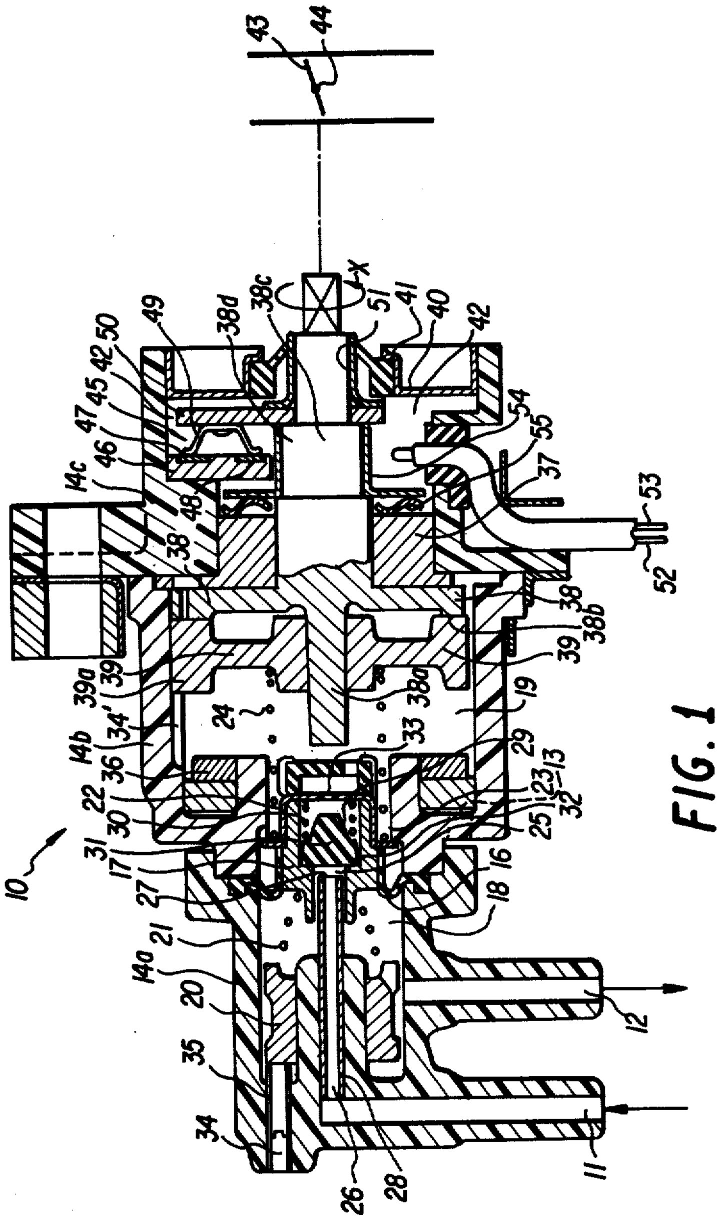
FIG. 1 is a cross-sectional view of a signal generating device operable in response to the opening degree of a throttle valve according to the present invention.

Referring now to the drawings, wherein like reference numerals designate identical or corresponding parts throughout the several views, and more particularly to FIG. 1 thereof, there is shown a signal generating device 10 according to the present invention which includes a first body 14*a*, of resin material, having a vacuum inlet port 11 in communication with a vacuum source such as an intake manifold for a vehicle and a vacuum outlet port 12 in communication with a vacuum actuated device. A second body 14*b* consisting of resin material having an atmospheric inlet port 13, is shown as well as a third body 14*c* of resin material with the first, second and third bodies 14*a*, 14*b* and 14*c* being connected to one another.

A diaphragm 16 has an outer periphery which is securely inserted between both bodies 14*a* and 14*b* and an inner periphery on which a movable member 17 is secured, whereby a diaphragm type of a movable means is defined, as well as vacuum and atmospheric pressure chambers 18 and 19, respectively. The chamber 18 is positioned between inlet and outlet ports 11 and 12 while the chamber 19 is always in communication with port 13 through air filter 36. The movable member 17 is positioned within vacuum chamber 18 and is normally maintained in its illustrated position by means of a spring 21 one end of which is seated against a retainer 20. Another retainer 22, which is positioned within atmospheric chamber 19, is brought in contact with an inner shoulder 23 formed on second body 14*b*. The movable member 17 is biased to the left through retainer 22 by means of a spring 24, the biasing force of which is smaller than that of the spring 21. The movable member 17 has a central hole 25 with a stationary member 28, which is press fit to body 14*a*, partially extending into an intermediate portion of hole 25.

The member 28 has a central passage 26 which is in communication with inlet port 11 and a right end which functions as valve seat 27. A right side concave portion 29 is formed on a valve member 31 and, which is biased by means of a spring 30 one end of which is seated against retainer 22. The valve member 31 is normally brought in contact with a valve seat 32 provided on the movable member 17 to thereby interrupt fluid communication between concave portion 29 and vacuum chamber 18, the concave portion 29 being in communication with atmospheric chamber 19 through means of an orifice 33 provided on retainer 22. Thus, valve member 31 is normally spaced from seat 27 to complete fluid communication between inlet port 11 and vacuum chamber 18 through means of passage 26 and central hole 25.

When vacuum pressure within vacuum chamber 18 increases and movable member 17 is moved to the left by a predetermined distance, valve member 31 is brought in contact with valve seat 27 and further movement of valve member 31 is prevented. By continuous leftward movement of movable member 17, valve seat 32 is then spaced from valve member 31 and, therefore, atmospheric air will be introduced within vacuum chamber 18 through means of orifice 33, concave portion 29 and central hole 25. Therefore, vacuum pressure within vacuum chamber 18 is decreased and movable member 17 is urged to be moved to in a rightward direction in FIG. 1. Valve seat 32 is then brought in contact with valve member 31, again, to thereby interrupt introduction of atmospheric air and valve member 31 is spaced from valve seat 27, again, to thereby complete fluid communication between inlet port 11 and vacuum chamber 18. Hereinafter, the above operations will be repeated and vacuum pressure within vacuum chamber 18 will be regulated into a predetermined value. This regulated vacuum pressure will be transmitted to a vacuum actuated device through outlet port 12.

The regulated pressure may be set by means of the biasing forces of springs 21 and 24. The biasing force of spring 21 may be adjusted in response to the position of retainer 20 which is adjustably moved by a screw 35 threaded through body 14a. The numeral 34 represents a seal. The biasing force of spring 24 may be adjusted in response to a position of a retainer 39 which is adjustably moved by a cam means 38 which is, in turn, rotably supported within body 14b via a bearing 37. Retainer 39 and cam means 38 are clearly illustrated in FIGS. 2 and 3, respectively. Retainer 39 is slidably supported by a rod portion 38a of cam means 38 and an outer projection 39a of retainer 39 is slidably received within inner groove 34' of body 14b to thereby be prevented from rotating. When cam surfaces 39b, 39b of retainer 39 are brought in contact with ends A, A of cam surface 38b, 38b, retainer 39 is positioned at an extreme leftward position in FIG. 1. From the above conditions it can be seen that when cam means 38 is rotated in the direction of the arrow X, cam surfaces 39b, 39b slide on cam surfaces 38b, 38b of cam means 38 towards opposite ends of cam surfaces 38b, 38b and therefore retainer 39 is moved to the right of FIG. 1 in proportion to the magnitude of rotation of cam means 38. Thus, the biasing force of spring 24 will be decreased proportionally.

Cam means 38 has a shaft 38c which extends out of body 14c and is operatively connected to a rotatable axis 44 of a throttle valve 43 and thus the magnitude of rotation of cam means 38 in the direction of the arrow X is in proportion to the opening degree of the throttle valve 43. A retainer 40 is press fit within the opening portion of the right end of body 14c and has at inner periphery a seal member 41 to thereby define an annular chamber 42. A potentiometer 45 is positioned within chamber 42. The potentiometer 45 includes a circular arc stator 46 of insulation material which is secured to body 14c and a slidable contactor 49 to contact electric conductors 47 and 48 which are secured to one side of stator 46. The slidable contactor 49 is secured by bolts to an insulating plate 50 which is secured to shaft 38c of cam means 38 by means of a shoulder 38d of shaft 38c and retainer 51 which is press fit on shaft 38c. Electric conductors 47 and 48 are connected to lead wires 52 and 53 of constant voltage, respectively, and the electric resistance applied between lead wires 52 and 53 by means of conductors 47 and 48 and contactor 49 by rotation of cam means 38 in the direction of arrow X will be decreased in proportion to the magnitude of rotation of cam means 38. A wave spring 55 is positioned between bearing 37 and retainer 54 which is press fit on shaft 38c to thereby bias cam means 38 against the left surface of bearing 37.

Cam means 38 is rotated in the direction of the arrow X in proportion to the opening degree of throttle valve 43 to proportionally reduce the biasing force of spring 24. Accordingly the force to bias the movable member 17 to the left by springs 21 and 24 will be proportionally reduced and the vacuum pressure at outlet port 12 will be increased in proportion to the degree of opening of the throttle valve 43 as shown in FIG. 4.

The electric resistance applied between wires 52 and 53 by the potentiometer 45 by rotation of cam means 38 will be decreased in proportion to the degree of opening of the throttle valve 23 and therefore output current at wires 52 and 53 will be proportionally changed as shown in FIG. 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A signal generating device operable in response to the degree of opening of a throttle valve, comprising:

a body having a vacuum inlet port, a vacuum outlet port and an atmospheric inlet port;

movable diaphragm means positioned within said body to thereby define a vacuum chamber in communication with said vacuum outlet port and an atmospheric chamber in communication with said atmospheric inlet port, said movable diaphragm means being movable in response to vacuum pressure within said vacuum chamber;

at least one spring means biasing said movable diaphragm means towards said vacuum chamber;

a valve member associated with said movable means for controlling fluid communication between said vacuum inlet port and said vacuum chamber as well as fluid communication between said vacuum chamber and said atmospheric chamber;

at least one sliding means positioned within said body to adjust the biasing force of said at least one spring means;

cam means rotatably positioned within said body and operatively connected to said throttle valve to thereby cause said at least one sliding means to slide in response to the degree of opening of said throttle valve wherein said cam means further comprises a cam shaft rotatable in response to the degree of opening of said throttle valve and a cam face provided on a first end of said cam shaft;

a potentiometer positioned on a second end of said cam shaft opposite said cam means, said cam face being engageable with said sliding means having a stator which is securely positioned within said body and a slidable contactor which is secured to said cam means;

a pair of conductors and a pair of lead wires electrically connected to said pair of conductors, said conductors being in slidable contact with said slidable contactor, such that the electrical resistance between said conductors and therefore said lead wires is changed in response to rotation of said cam means;

said at least one spring means and said at least one sliding means including second spring means and second sliding means, respectively, wherein said second sliding means is positioned to adjust the biasing for said second spring means and wherein said second sliding means is adjustably positioned by a screw; and whereby said cam means provides a simultaneous regulation of the vacuum in said vacuum chamber and an electrical regulation of the output of said potentiometer so that said signal generating device simultaneously provides a linear relationship between the vacuum in said vacuum chamber and the opening of said throttle valve and also a linear relationship between the electrical output of said potentiometer and the opening of said throttle valve.

2. The signal generating device of claim 1 wherein said atmospheric inlet portion communicates with said atmospheric chamber through a filter positioned between said inlet port and said atmospheric chamber.

3. The signal generating device of claim 1 wherein said movable diaphragm means further comprises a movable member secured on an inner pheriphery of a diaphragm.

4. The signal generating device of claim 1 wherein said body further comprises a first, a second and a third resin material portion and with said first, said second and said third portions being respectively connected to one another.

5. The signal generating device of claim 4 wherein said vacuum chamber is contained within said first portion of said body and wherein said atmospheric chambers are contained within said second portion of said body.

6. The signal generating device according to claim 4 wherein said potentiometer is enclosed in said third portion of said body.

7. The signal generating device of claim 1 wherein the biasing force of said second spring means is less than the biasing force of another one of said at least one spring means.

8. The signal generating device of claim 1 further comprising a valve spring and retainer means disposed within said atmospheric chamber wherein said retainer means has an orifice formed therein and wherein said valve member is biased from said retainer by a valve spring so as to form a concave portion which is in communication with said atmospheric chamber by means of said orifice.

* * * * *